US006968258B2

(12) United States Patent
Oettinger

(10) Patent No.: US 6,968,258 B2
(45) Date of Patent: Nov. 22, 2005

(54) RESIDUAL FEEDBACK TO IMPROVE ESTIMATOR PREDICTION

(75) Inventor: Eric G. Oettinger, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 426 days.

(21) Appl. No.: 10/160,399

(22) Filed: May 31, 2002

(65) Prior Publication Data

US 2003/0225465 A1     Dec. 4, 2003

(51) Int. Cl.[7] .............................................. G01M 1/38
(52) U.S. Cl. ......................... 700/275; 700/29; 700/30; 700/41; 700/42; 700/45; 700/56; 700/59; 359/298; 359/295; 359/291; 359/221; 359/222; 359/223; 359/224; 359/225; 359/226; 359/230
(58) Field of Search ............................. 700/29, 30, 41, 700/42, 45, 56, 275; 359/298, 291, 214, 221, 359/224, 295

(56) References Cited

U.S. PATENT DOCUMENTS

| | | | | |
|---|---|---|---|---|
| 5,488,561 A | * | 1/1996 | Berkowitz et al. | ............. 700/45 |
| 6,088,630 A | * | 7/2000 | Cawlfield | .................... 700/266 |
| 6,272,326 B1 | * | 8/2001 | Shinde | ..................... 455/127.1 |
| 6,427,038 B1 | * | 7/2002 | Britz et al. | .................... 385/18 |
| 6,470,110 B1 | * | 10/2002 | Lin | .............................. 385/18 |
| 6,538,802 B2 | * | 3/2003 | Wang et al. | ................. 359/298 |

OTHER PUBLICATIONS

Bifano et al. "Microelectromechanical deformable mirrors" Feb. 1999, IEEE Journal of vol. 5, Issue 1, pp 83-89.*
Mukherjee et al. "Structured design of microelectromechanical systems", Jun. 1997, Proceedings of the 34th annual conference on Design automation.*

* cited by examiner

*Primary Examiner*—Anthony Knight
*Assistant Examiner*—Thomas Pham
(74) *Attorney, Agent, or Firm*—William B. Kempler; W. James Brady, III; Frederick J. Telecky, Jr.

(57) ABSTRACT

A system and method 100 of using residual feedback in a control loop in a manner that substantially eliminates the steady state error in the predicted states that results from the mismatch in gain between the plant and the model. The control effort used by the estimator to predict the next position is modified to compensate for this difference in gain. By integrating the residual, and modifying the apparent control effort accordingly, the residual is driven to have a mean value of zero. When the residual goes to zero, by definition, the steady state error in the position state goes to zero; and to the extent that the model matches the plant, the velocity state also approaches zero such that the steady state error in the predicted states are substantially eliminated, allowing for improved control.

11 Claims, 1 Drawing Sheet

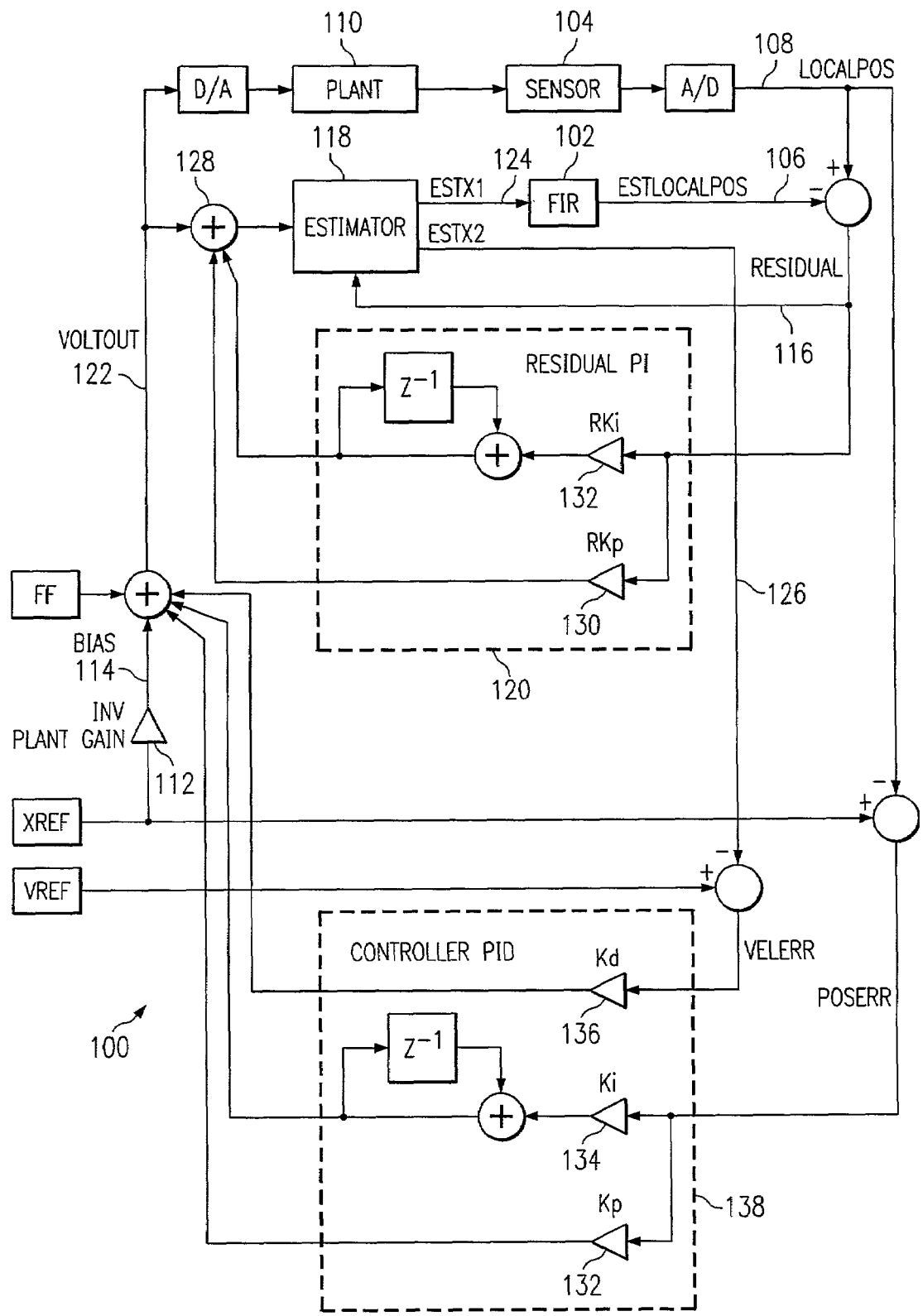

RESIDUAL FEEDBACK TO IMPROVE ESTIMATOR PREDICTION

BACKGROUND OF THE INVENTION

1. Field of the Invention

This invention relates generally to control system theory, and more particularly, to a method of controlling a micro-electro-mechanical MEM mirror motion.

2. Description of the Prior Art

An estimator-based controller associated with micro-electro mechanical system (MEMS) mirror movements contains a mathematical model of the mirror. This model predicts what the position (X1) and velocity (X2) should be for a given control effort; and due to a variety of sources, the model will have some error in the predictions. A standard textbook method of correcting for prediction mismatch is to calculate the "residual", the difference between the predicted and measured position, and then feed that error back into the underlying states using the following equations, where L1 and L2 determine the extent to which the residual error should affect the state variables X1 and X2.

$$X1 = X1 + (L1 * \text{Residual})$$

$$X2 = X2 + (L2 * \text{Residual})$$

Predictions associated with MEM mirrors are problematic however, in that the model is basically a spring; so a mismatch in the model results in a steady-state error in the predictions. When the residual correction is made, the result is a steady state error in the predicted states. This steady state error can cause an undesirable transient response. If, for example, there is a relatively high gain on the velocity error, the control loop will end up applying current to cancel the phantom velocity error. The integral term in the PID (proportional, integral, derivative) controller will eventually compensate for the large apparent velocity error; and when transients settle out, the loop will behave as desired.

When using feedback to move the mirror from one angular location to another (hereto referred to as seeks) however, the large required integrator value will change; and although it will eventually reach its final value, it takes many samples to do so. While it is converging however, the control effort is also changing and the position is not held very tightly. The root of this problem is a mismatch in gain between the model and the mirror.

In view of the foregoing, it would be both desirable and advantageous in the MEM mirror art to provide a method of using residual feedback in a MEMS mirror control loop in a manner that substantially eliminates the steady state error in the predicted states that results from the mismatch between the MEM mirror and the model.

SUMMARY OF THE INVENTION

The present invention is directed to a method of using residual feedback in a control loop in a manner that substantially eliminates the steady state error in the predicted states that results from the mismatch in gain between the physical plant and the estimator model. The control effort used by the estimator to predict the next position is modified to compensate for this mismatch in gain. By integrating the residual, and modifying the apparent control effort accordingly, the residual is driven to have a mean value of zero. When the residual goes to zero, by definition, the steady state error in the position goes to zero; and if the model is accurate, the velocity state will also approach zero such that the steady state error in the predicted states are substantially eliminated.

According to one embodiment, a method of generating residual feedback to improve physical plant control comprises the steps of driving a physical plant system with a first input signal and generating a measured plant output signal; driving an estimator with the first input signal, and at least one signal which is a function of the integral of a residual feedback signal, and generating an estimated plant output signal there from; combining the measured plant output signal and the estimated plant output signal and generating the residual feedback signal there from; and processing the residual feedback signal and generating the at least one signal which is a function of the integral of a residual feedback signal there from, such that a difference between the measured plant output signal and the estimated plant output signal has a smaller error than that achievable when using an estimator based control system that employs residual feedback but that does not use a residual gain feedback signal.

According to another embodiment, a method of generating residual feedback to improve physical plant control comprises the steps of driving a physical plant system with a first input signal and generating a measured physical plant output signal there from; generating an estimated physical plant output signal in response to the first input signal, and further in response to a residual integral feedback signal, wherein the residual integral gain feedback signal is generated solely in response to a residual feedback signal defined by a difference between the measured physical plant output signal and the estimated physical plant output signal; and adjusting the first input signal in response to the estimated physical plant output signal.

According to yet another embodiment, a method of generating residual feedback to improve physical plant control comprises the steps of driving a position control system with a first input signal and generating a measured local position signal there from; generating an estimated local position signal in response to the first input signal, a residual feedback signal, and further in response to a plurality of residual gain feedback signals, wherein the measured local position signal and the estimated local position signal are combined to generate the residual feedback signal, and further wherein the plurality of residual gain feedback signals are generated solely in response to the residual feedback signal; and adjusting the first input signal in response to the estimated local position signal.

According to still another embodiment of the present invention, a control system comprises a physical plant operational to generate an output signal in response to an input signal; a sensor operational to measure the physical plant output signal and generate a measured output signal there from; an estimator operational in response to the input signal to generate an estimated plant output signal there from; a first combinatorial element operational to combine the measured plant output signal and the estimated plant output signal and generate a residual feedback signal there from; at least one constant gain element operational solely in response to the residual feedback signal to generate at least one residual gain feedback signal; and a second combinatorial element operational to combine the input signal to the estimator with the at least one residual gain feedback signal such that the estimator generates an estimated plant output signal having a smaller error than that achievable using an estimator based control system that does not employ at least one constant gain element operational solely in response to the residual feedback signal to generate at least one residual gain feedback signal.

BRIEF DESCRIPTION OF THE DRAWINGS

Other aspects, features and advantages of the present invention will be readily appreciated, as the invention becomes better understood by reference to the following detailed description when considered in connection with the accompanying drawing FIGURE wherein:

The single FIGURE is a block diagram illustrating an estimator based control system according to one embodiment of the present invention.

While the above-identified drawing FIGURE sets forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The particular embodiments of the invention described herein below are best understood by first reiterating the discussion of the problem to be solved set forth herein before. An estimator-based controller associated with MEM mirror movements contains a mathematical model of the mirror. This model predicts what the position and velocity should be for a given control effort; and due to a variety of sources, the model will have some error in the predictions. A standard textbook method of correcting for prediction mismatch is to calculate the "residual", the difference between the predicted and measured position, and then feed that error back into the underlying states using the following equations.

$$X1 = X1 + (L1 * \text{Residual})$$

$$X2 = X2 + (L2 * \text{Residual})$$

Predictions associated with systems having a large bias force which is dependant on position, a MEM mirrors for example, are problematic however, in that a mismatch in the model results in a steady-state error in the predictions. When the residual correction is made, the result is a steady state error in the predicted states. If there is a relatively high gain on the velocity error (i.e. a large Kd value), the control loop ends up applying current to cancel the phantom velocity error (VelErr). The integral term in the PID (proportional, integral, derivative) controller will eventually compensate for the large apparent velocity error and the loop may behave as desired, but transients occurring while the integrator settles to it's final value may be problematic.

When using feedback to move the mirror from one angular location to another (hereto referred to as seeks), the large required integrator value will change; and although it will eventually reach its final value, it takes many samples to do so. While it is converging, the control effort is also changing and the position is not held very tightly. The root of this problem is a mismatch in gain between the model and the mirror.

In view of the foregoing, a method of using residual feedback in a MEMS mirror control loop according to one embodiment of the present invention that substantially eliminates the steady state error in the predicted states that results from the mismatch in gain between the MEMS mirror and the model is now described in detail with reference to the single FIGURE; where The FIGURE shows a block diagram illustrating an estimator based control system 100 for controlling the motion of a MEMS mirror. Although described in terms of a MEMS mirror, the present invention is not so limited, and it shall be understood that the principles described herein below with reference to the FIGURE shall apply to control systems in general. With continued reference now to the single FIGURE, the blocks labeled FF, XRef, and VRef, are simply used to perform seeks, and are not particularly relevant to the present invention. The term seek, as used herein, means the process of moving the mirror from one angular location to another. The FF block is a feed-forward current. When performing a seek, the current waveform is supplied via a FF table that is very close to the control effort necessary to perform the seek. If, for example, all feedback was turned-off, application of the FF current pulse would cause movement most of the way from the starting point to the ending point. Without use of feedback, system variability then prevents exact movement from the starting point to the ending point. The FF table discussed herein above includes expected seek position (Xref) and velocity (Vref) data necessary to keep the MEM mirror on track while moving during a seek.

Although described now with reference to a MEM mirror, the present invention shall be understood to apply generally to any control system that employs residual feedback for an estimator based controller. The FIR block 102 is a "Finite Impulse Response" filter, that is designed to provide a response similar to the Sensor 104. This feature makes the estimated position (EstLocalPos) 106, more closely match the measured position (LocalPos) 108. FIR 102 basically simulates the rise time associated with the Sensor 104, allowing the phase of the prediction to match the phase of the measurement. While shown in the FIGURE, this block also has little relevance to the present invention.

All of the triangle blocks seen in the FIGURE represent constant gains; wherein Kp 132, Ki 134, and Kd 136 are the proportional, integral and derivative gains respectively that constitute the PID controller 138. PID controllers are very well known to those skilled in the control system art, and so a detailed description of how a PID controller functions generally will not be set forth herein for purposes of brevity and to more clearly describe the principles related to the present invention. Assuming now that Plant 110 is a micro-electro-mechanical system (MEMS) mirror, InvPlantGain 112 is used to calculate the bias force; wherein the bias 114 is the force required to hold the mirror 110 at some given position. This concept can more easily be understood by thinking of a spring, where the bias is the amount of constant force necessary to keep the spring stretched to a specific length.

Although PID control system 100 employs residual feedback, it does so in a manner, that has been recognized solely by the present inventor, to achieve a control effort heretofore unknown in the estimator based control system art. Although, for example, many estimator based control systems employ a residual feedback 116 to an Estimator 118 such as also seen in the FIGURE, these known estimator based control systems have failed to recognize the possibilities associated also with use of a Residual integral feedback element 120 to distinguish between the control effort applied to the plant versus that applied to the estimator model. Additional benefit may be found with more advanced residual feedback, such as the proportional, integral controller pictured in the FIGURE.

Looking again at the FIGURE, it can be seen that the Plant 110 and Estimator 118 both are driven by the VoltOut signal 122. If the Plant model (Estimator 118) exactly matched the Plant 110, this input signal 122 would be all that is necessary to achieve the requisite Plant 110 control; since the same control input would give the same outputs (EstX1-estimated position 124, and EstX2-estimated velocity 126 would exactly match the real position and velocity of the mirror (Plant 110)).

Residual feedback 120 however, importantly modifies the control effort that the Estimator 118 sees compared with what the Plant (MEM mirror) 110 sees. Estimator 118 now predicts outputs EstX1 124 and EstX2 126 based on a slightly different control effort input 128. The present inventor has found the difference in inputs 122, 128 will eventually force the Plant 110 and Estimator 118 outputs to be the same if the residual feedback contains an integral component. The additional use of a proportional component was found to significantly speed the convergence process. The gain elements RKp 130 and Rki 132 are the proportional and integral gains of this example feedback loop.

In view of the above, it can be seen the present invention presents a significant advancement in the art of MEMS mirror positioning techniques. Further, this invention has been described in considerable detail in order to provide those skilled in the MEMS mirror art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims that follow.

What is claimed is:

1. A method of generating residual feedback to improve physical plant control, the method comprising the steps of:
    driving a physical plant system with a first input signal and generating a measured plant output signal;
    driving an estimator with the first input signal, and at least one residual gain feedback signal, and generating an estimated plant output signal there from;
    combining the measured plant output signal and the estimated plant output signal and generating a residual feedback signal there from; and
    processing the residual feedback signal and generating a residual integral gain portion of the at least one residual gain feedback signal there from, such that a difference between the measured plant output signal and the estimated plant output signal has a smaller error than that achievable when using an estimator based control system that employs residual feedback but that does not use a residual gain feedback signal, and
    wherein the step of driving a physical plant system comprises driving a micro-electro-mechanical system (MEMS) mirror.

2. The method according to claim 1 wherein the step of processing the residual feedback signal and generating a residual integral gain portion of the at least one residual gain feedback signal there from further comprises processing the residual feedback signal and generating a residual proportional gain portion of the at least one residual gain feedback signal, wherein the residual proportional gain portion of the at least one residual gain feedback signal operates to speed up convergence of the estimated plant output signal error to zero.

3. A method of generating residual feedback to improve physical plant control, the method comprising the steps of:
    driving a physical plant system with a first input signal and generating a measured physical plant output signal there from;
    generating an estimated physical plant output signal in response to the first input signal, and further in response to a residual integral gain feedback signal, wherein a residual feedback signal is generated in response to the measured physical plant system output signal and further in response to the estimated physical plant system output signal, and further wherein the residual integral gain feedback signal is generated solely in response to the residual feedback signal; and
    adjusting the first input signal in response to the estimated physical plant output signal, and
    wherein the step of driving a physical plant system comprises driving a micro-electro-mechanical system (MEMS) mirror.

4. The method according to claim 3 wherein the step of generating an estimated physical plant output signal further comprises generating an estimated physical plant output signal further in response to a residual proportional gain feedback signal in a manner that speeds up convergence of the estimated plant output error to zero, wherein the residual proportional gain feedback signal is generated solely in response to the residual feedback signal.

5. The method of generating residual feedback to improve physical plant control, the method comprising the steps of:
    driving a micro-electro-mechanical system (MEMS) mirror with a first input signal and generating a measured local position signal there from;
    generating an estimated local position signal in response to the first input signal, and further in response to a plurality of residual gain feedback signals, wherein the measured local position signal and the estimated local position signal are combined to generate a residual feedback signal, and further wherein the plurality of residual gain feedback signals are generated solely in response to the residual feedback signal; and
    adjusting the first input signal in response to the residual gain feedback signals.

6. The method according to claim 5 wherein the step of generating an estimated local position signal in response to a plurality of residual gain feedback signals comprises generating the estimated local position signal in response to a residual integral gain signal.

7. The method according to claim 6 wherein the step of generating an estimated local position signal in response to a plurality of residual gain feedback signals further comprises generating an estimated local position signal in response to a residual proportional gain signal.

8. The method according to claim 5 wherein the step of generating an estimated local position signal comprises processing an estimator output signal via a finite impulse response filter such that the estimated local position signal and the measured local position signal have substantially identical phase characteristics.

9. A control system comprising:
    a physical plant operational to generate an output signal in response to an input signal;

a sensor operational to measure the physical plant output signal and generate a measured output signal there from;

an estimator operational in response to the input signal to generate an estimated plant output signal there from;

a first combinatorial element operational to combine the measured plant output signal and the estimated plant output signal and generate a residual feedback signal there from;

at least one constant gain element operational solely in response to the residual feedback signal to generate at least one residual gain feedback signal; and a second combinatorial element operational to combine the input signal to the estimator with the at least one residual gain feedback signal such that the estimator generates an estimated plant output signal having a smaller error than that achievable using an estimator based control system that does not employ at least one constant gain element operational solely in response to the residual feedback signal to generate at least one residual gain feedback signal;

a finite impulse response filter operational to process the estimated plant output signal such that the estimated plant output signal and the measured plant output signal have substantially identical phase characteristics, wherein at least one constant gain element comprises an integral gain element, and wherein the plant and sensor are combined to formulate a micro-electro-mechanical (MEM) mirror element.

10. The control system according to claim 9 wherein the at least one constant gain element further comprises a proportional gain element, wherein the proportional gain element is operational to speed up convergence of the estimated plant output signal error to zero.

11. The control system according to claim 9 wherein the plant output signal is a MEM mirror position signal.

* * * * *